2,984,586
TREATMENT OF GLASS FIBERS WITH 4,4'-BIS-(p-HYDROXYPHENYL)-PENTANOIC ACID

Archie W. Koon, Auburn, N.Y., assignor to Columbian Rope Company, Auburn, N.Y., a corporation of New York No Drawing. Filed Dec. 30, 1959, Ser. No. 862,785

5 Claims. (Cl. 117—126)

This invention is related to the coating of glass fibers and more particularly to the application of 4,4'-bis-(p-hydroxyphenyl)-pentanoic acid to glass fibers.

It has been observed that glass fibers are very strong when freshly spun even surpassing comparable steel fibers. It has also been noted that these glass fibers upon exposure to air or on being twisted into fibers, shortly lose much of their original strength. This marked decline in the strength of the glass fibers appears to be due to damage of the fiber or filament surface. In the case of atmospheric deterioration of the fiber, this is probably due principally to the water vapor present plus other chemically reactive foreign substances which are generally found in the air in minor amounts. Although the reaction of the chemically active substance may be very localized, a weakness has been developed in the filament where stresses can concentrate and as a result the fiber is no longer capable of sustaining high mechanical loads. Where the fibers are twisted together, an apparent mechanical abrasion of the fibers takes place where the fibers contact one another such that again areas of weakness are formed which ultimately result in the fibers having reduced mechanical strength.

To overcome the aforementioned weaknesses which develop in glass fibers of filaments, various coatings and surface treatments have been devised for glass filaments, some of which have been found to be commercially feasible. Among those which have been found useful are certain organic hydroxyl derivatives. However, they have also been found to have certain limitations including being excessively corrosive, having only a temporary effect, or prohibitively expensive.

Accordingly it is an object of this invention to provide an improved and economical method for coating glass fibers or filaments. A further object of this invention is to provide a method for coating glass filaments or fibers for the purpose of enhancing their tensile strength. These and other objects of the invention will be apparent from the description which follows.

The novel process of this invention comprises reacting a glass filament or a plurality of glass filaments, such as a cord, with a solution of 4,4'-(p-hydroxyphenyl)-pentanoic acid and thereafter baking the solution onto the fiber or cord.

The present invention will be more completely understood by reference to the following examples. In each instance all parts and percentages are by weight unless otherwise noted.

Example I

A glass cord, size 150–4–0, was passed through a 40% solution of 4,4'-bis-(p-hydroxyphenyl)-pentanoic acid in 94% ethanol that is, the ethanol contained 6% water by volume. The glass cord picked up about 10% of the acid by weight, that is, each 10 lbs. of glass cord was coated with about 1 lb. of the acid. The product was then dried and baked thirty minutes at 320° F. The results of tensile strength tests on untreated cords and those treated with the above acid were as follows:

| Material: | Average break in pounds |
|---|---|
| A. Untreated cord— | |
| Tested dry | 12.6 |
| Tested wet | 6.8 |
| B. Treated cord— | |
| Fresh, dry | 16.6 |
| Five days old, dry | 16.1 |
| Tested wet | 7.8 |

Example II

The same procedure was employed as set forth in Example I except a 10 ply cord was used, namely, size 150–4–10.

The test results were as follows:

| Material: | Average break in pounds |
|---|---|
| A. Untreated cord— | |
| Tested dry | 94 |
| Tested wet | 67 |
| B. Treated cord— | |
| Fresh, dry | 143 |
| Five days old, dry | 141 |
| Tested wet | 84 |

The foregoing examples are presented merely as typical illustrations of the process of the present invention and it is not intended that the invention is to be limited thereby.

Although the baking conditions are given as being 30 minutes at 320° F., it is to be understood that the time can be shortened if higher temperatures are used provided these temperatures are not of such intensity as to effect deleteriously the fiber or to decompose the acid coating. On the other hand lower baking temperatures can be employed, but longer baking periods will be required. Solvents other than ethanol can be used to dissolve the acid provided the solvent does not corrode the glass fiber filament or cord. The present invention is equally applicable to individual glass filaments or fibers as it is to a plurality of fibers grouped together such as cords and strands.

Various methods can be used to prepare the 4,4'-bis-(p-hydroxyphenyl)-pentanoic acid. By way of example, this acid may be prepared by reacting phenol with levulinic acid in the presence of a mineral acid (J. Am. Chem. Soc. 76, 4465–6, 1954).

It is to be understood that various modifications can be made by one skilled in the art without departing from the spirit of my invention as defined in the following claims.

I claim:

1. The method of producing coated glass fibers comprising passing a glass fiber through a solution of 4,4'-bis-(p-hydroxyphenyl)-pentanoic acid and thereafter baking said solution on said fiber.

2. The method of producing coated glass fibers comprising passing a glass fiber through a solution of 4,4'-bis-(p-hydroxyphenyl)-pentanoic acid and drying said coated fiber at about 320° F. for about 30 minutes.

3. As an article of manufacture, a glass cord coated with 4,4'-bis-(p-hydroxyphenyl)-pentanoic acid.

4. The article of claim 3 in which the ratio by weight of cord to 4,4'-bis-(p-hydroxyphenyl)-pentanoic acid is about 10:1.

5. In a method of producing coated glass fibers characterized by having improved tensile strength the steps comprising passing a glass fiber through a solution of 4,4'-bis-(p-hydroxyphenyl)-pentanoic acid and thereafter drying and baking said solution on said fiber.

References Cited in the file of this patent

UNITED STATES PATENTS 2,933,520 Bader ---------------- Apr. 19, 1960